(12) United States Patent
Tamura (10) Patent No.: US 7,676,496 B2
(45) Date of Patent: Mar. 9, 2010

(54) CONTENT MANAGEMENT SYSTEM, CONTENT MANAGEMENT METHOD AND COMPUTER PROGRAM

(75) Inventor: Misa Tamura, Tokyo (JP)

(73) Assignee: Sony Corporation, Tokyo (JP)

( * ) Notice: Subject to any disclaimer, the term of this patent is extended or adjusted under 35 U.S.C. 154(b) by 318 days.

(21) Appl. No.: 11/240,562

(22) Filed: Oct. 3, 2005

(65) Prior Publication Data

US 2006/0074888 A1    Apr. 6, 2006

(30) Foreign Application Priority Data

Oct. 4, 2004    (JP)    ............ P2004-291304

(51) Int. Cl.
*G06F 17/00*    (2006.01)

(52) U.S. Cl. ............. 707/104.1; 707/5; 707/6; 715/273; 715/736

(58) Field of Classification Search ........... 707/104, 707/100, 5, 2, 3; 715/738, 273
See application file for complete search history.

(56) References Cited

U.S. PATENT DOCUMENTS

| | | | | |
|---|---|---|---|---|
| 6,237,006 | B1 * | 5/2001 | Weinberg et al. | 707/103 R |
| 6,331,861 | B1 * | 12/2001 | Gever et al. | 345/629 |
| 6,629,097 | B1 * | 9/2003 | Keith | 707/5 |
| 6,721,759 | B1 | 4/2004 | Rising, III | |
| 6,985,898 | B1 * | 1/2006 | Ripley et al. | 707/5 |
| 7,133,860 | B2 * | 11/2006 | Iizuka et al. | 707/2 |
| 2003/0160817 | A1 | 8/2003 | Ishida et al. | |
| 2003/0187836 | A1 * | 10/2003 | Ikeda | 707/3 |
| 2004/0107194 | A1 | 6/2004 | Thorpe | |
| 2004/0139096 | A1 | 7/2004 | Rising, III | |

FOREIGN PATENT DOCUMENTS

| | | |
|---|---|---|
| EP | 1 424 640 A2 | 6/2004 |
| JP | 07-129602 | 5/1995 |
| JP | A-8-44759 | 2/1996 |
| JP | 10-116296 | 5/1998 |
| JP | 11-096185 | 4/1999 |
| JP | 2000-172707 | 6/2000 |
| JP | 2000-305944 | 11/2000 |
| JP | A-2001-229180 | 8/2001 |
| JP | 2001-350793 | 12/2001 |
| JP | 2002-202975 | 7/2002 |
| JP | 2003-216651 | 7/2003 |
| WO | WO 00/39712 | 7/2000 |

* cited by examiner

*Primary Examiner*—Mohammad Ali
*Assistant Examiner*—Thuy (Tiffany) Bui
(74) *Attorney, Agent, or Firm*—Finnegan, Henderson, Farabow, Garrett and Dunner, L.L.P.

(57) ABSTRACT

The invention provides a user with a key or a visual clue to a desired content. There is provided a random search mode searching the content randomly when a user has no object for searching the content, and a specific search mode with object or search condition specified. The search condition is randomly generated or the content is extracted regardless of the search condition under the random search mode while the content is extracted based on the search condition such as a media type of the content input by the user or other content attributes.

9 Claims, 10 Drawing Sheets

CONTENT MANAGEMENT SYSTEM, CONTENT MANAGEMENT METHOD AND COMPUTER PROGRAM

CROSS REFERENCES TO RELATED APPLICATIONS

The present invention contains subject matter related to Japanese Patent Application JP 2004-291304 filed in the Japanese Patent Office on Oct. 4, 2004, the entire contents of which being incorporated herein by reference.

BACKGROUND OF THE INVENTION

1. Field of the Invention

The invention relates to a content management system, a content management method and a computer program which manage preferably contents of digitized various media. More specifically, the invention relates to a content management system, a content management method and a computer program which manage preferably enormous amount of contents existing across plural devices.

In more detail, the invention relates to a content management system, a content management method and a computer program which manage preferably astronomical amount of contents existing on a global basis and in which contents with various media types provide a user with a key or a clue to a desired content under a computing environment.

2. Description of the Related Art

With a recent rapid progress in information technology (IT), computer systems in various forms have been developed, manufactured and widely used in universities and other research institutes, offices and household. On a computer, various media such as sound, image and natural language as well as a plain text document file are digitized and dealt with mathematically, and thereby it becomes possible to perform an advanced process such as editing, processing, accumulation, management, transmission, distribution and sharing of information. As this, on a computer system, content with various media types can be dealt with.

Recently, in addition, information and communications network extends from a private network such as a home LAN to a wide area network such as the Internet. Various devices such as PC, PDA, camcorder, digital camera, TV receiver, DVD player and HD recorder are connected to a home LAN, and can share the generated or acquired content with each other and use the content for playing and so on. A user can acquire a desired content from a remote content server. In short, enormous amount of contents with various media types can be used on a network to which various devices are connected.

Although the computing environment capable of dealing with enormous amount of various media contents seems to be convenient, there is a problem how to manage the enormous amount of contents. To put it strongly, existence of astronomical amount of contents on a global basis makes it difficult for a user to reach desired media and the user tends to forget what content he/she desires to reach.

Now various resource objects are displayed by icon on a desk top screen with which GUI (Graphical User Interface) is provided, which makes it possible to be dealt with intuitive input operation and to be convenient. However, nothing provides a key or a clue to a desired content. As a result, a user cannot use a usable content effectively to lead to a dead storage of content.

For example, there is proposed an information retrieval system which provides a navigation of search feeding back accurately which part of stored information the information shown to a system by a searcher corresponds to (for example, refer to Patent Document 1). In this information retrieval system, the stored information is classified by an individual fixed viewpoint and a view displaying each component thereof is prepared for each viewpoint. This view changes dynamically operating with each view in response to the matching number of the search results and the view selection process by the user, in the process of searching. Also, the information searched by applying the previous view is fed back to a group of information narrowed by the searcher to give a new condition for narrowing. This feedback, which is a key to find the condition for narrowing that was not expected initially, helps a searcher without a sufficient expertise in the corresponding technical field find a desired subject according to the keyword given in rough examination.

This information retrieval system, however, cannot provide a user having no a guideline for searching such as what media type of content is available, with a key or a clue to find content that the user desires to use from a huge content-accumulated space.

In addition, there is proposed a content retrieval device extracting a keyword automatically by performing voice recognition and image recognition of input information such as voice information and image information to search a desired appropriate content effectively (for example, refer to Patent Document 2). In this content retrieval device, for example, a keyword is acquired by performing voice recognition of input voice information to output the content corresponding to the keyword of the result of voice recognition as a search result by comparing the keyword with a keyword stored and managed corresponding to the content in a keyword-content correspondence table part.

This content retrieval device, however, in which the keyword search is basic, does not provide a user having no a guideline for searching (without technique of specifying even a keyword) with a key or a clue to find a content that the user desires to use from a huge content-accumulated space. In addition, it is assumed that the keyword of content to be searched is registered in the keyword-content correspondence table part. It is impossible to perform a keyword registration for all contents existing in a huge content-accumulated space, and the range of application becomes limited.

[Patent Document 1] JP-A-8-44759
[Patent Document 2] JP-A-2001-229180

SUMMARY OF THE INVENTION

It is desirable to provide excellent content management system, content management method and computer program which suitably manage enormous amount of contents existing.

It is further desirable to provide excellent content management system, content management method and computer program in which contents with various media types can provide a user with a key or a visual clue to a desired content under a computing environment.

According to a first aspect of the invention, there is provided a content management system managing many contents accumulated in plural devices, including: a command inputting section specifying a content search mode and a content search condition; a screen format generating section generating a screen format in a two- or three-dimensional display form likened to infinite outer space; a content searching section searching the content presenting space comprised of the plural devices accumulating contents according to the specified search condition; and a content presenting section controlling so that information on each content retrieved by the content searching section is displayed and output by mapping respectively on a star on the outer space of the screen format.

However, "system" mentioned here means logically combined of plural devices (or a functional module realizing a specific function), and it does not matter whether each device or a functional module is in a single chassis or not.

Information and communications network extends from a private network such as a home LAN to a wide area network such as the Internet, and enormous amount of contents with various media types can be used. In such a case, it is necessary to provide a user having no guideline for searching for example a user having no information what media type of content is available, with a key or a clue to find a content that the user desires to use from a huge content-accumulated space.

The inventors consider there should be a suitable viewing style for each content. The invention, accordingly, proposes a content management system capable of not presenting while being bound by existence of content as in an existing directory structure but taking a viewing style to make the content interesting a user easily viewable.

In a content management system according to an embodiment of the invention, further includes: a random search mode searching the content randomly when a user has no object for searching the content; and a specific search mode with object or search condition specified; wherein the content searching section under the random search mode, generates the search condition randomly or extracts the content regardless of the search condition, and under the specific search mode extracts (filters) the content from a huge content presenting space based on the search condition such as a media type of the content or other content attributes input through the command input section.

Therefore, when a user does not have a specific object, he/she extracts content randomly under the random search mode from a huge content presenting space. For example, a user repeats this random searching until getting the content interesting the user or getting a clue to search content.

When the user can obtain an object to search content as a result of the random searching, or, when the user has an object to search content from the beginning, on the other hand, the user inputs a desired searching condition to carry out the specific search under the specific search mode. When the user cannot narrow the content sufficiently even with the specific search or the input searching condition is not appropriate, the searching condition is input again or the entry is corrected repeatedly under the specific search mode to search the expedient content in the content presenting space.

When reaching the desired content under the specific search mode or losing the object for other reasons, there returns to the random search mode and the user searches the content interesting the user or a clue to search content.

Using the screen format designed by likening to infinite outer space, the searching result is presented to the user. On individual stars on the outer space displayed two- or three-dimensionally, the content accumulated in the content presenting space is randomly mapped. The content viewing style likened to outer space reminds a user that many unidentified appealing contents are buried in the huge content presenting space.

A distance from a center of the outer space to the star indicates a matching degree of the search condition with the content allocated to the star. The content can be mapped multidimensionally based on the matching degree by displaying the outer space three-dimensionally. A fitness for the search condition, a matching degree with a user's preference and other meanings, can be defined for a distance from the center of the outer space to each content mapped on the star and a distance between stars, a direction from the center, a screen size and so on.

A content management system may further include a group registering section registering a content group mapped on an area within a range of a predetermined radius from the center of the outer space and within a predetermined angle as a group.

According to a second aspect of the invention, there is provided a computer program described in a readable format so as to perform a process for managing many contents accumulated in plural devices on a computer system, including: a command inputting step of specifying a content search mode and a content search condition; a screen format generating step of generating a screen format in a two- or three-dimensional display form likened to infinite outer space; a content searching step of searching the content presenting space comprised of the plural device accumulating the contents according to the specified search condition; and a content presenting step of controlling so that information on each content retrieved in the content searching step is displayed and output by mapping respectively on a star on the outer space of the screen format.

The computer program according to the second aspect of the invention defines the computer program described in a readable format so as to perform a predetermined process on a computer system. In other words, installing the computer program according to the second aspect of the invention in a computer system allows to exhibit a cooperative action on the computer system and makes it possible to obtain the same effect as in the content management system according to the first aspect of the invention.

According to an embodiment of the invention, there can be provided excellent content management system, content management method and computer program which manage enormous amount of contents existing.

According to an embodiment of the invention, there can be provided excellent content management system, content management method and computer program in which contents with various media types can provide a user with a key or a visual clue to a desired content under a computing environment.

Other purposes, characteristics and advantages according to an embodiment of the invention may become clear by a detailed description based on an embodiment of the invention described later and attached drawings.

DETAILED DESCRIPTION OF PREFERRED EMBODIMENTS

Hereinafter, an embodiment of the invention will be described in reference to drawings.

A. Outline

With development of information technology, information and communications network extends from a private network such as a home LAN to a wide area network such as the Internet. For example, various devices such as PC, PDA, camcorder, digital camera, TV receiver, DVD player and HD recorder are connected to a home LAN and can share the generated or acquired content with each other and use the content for playing and so on. A user can acquire a desired content from a remote content server.

Although enormous amount of contents with various media types can be used on a network to which various devices are connected, there is a problem how to manage the enormous amount of contents in order to use the contents effectively. A content management system according to an embodiment of the invention supports effective use of content by providing a user with a key or a visual clue to a desired content.

In the past, content was generally managed by using a layered system using a directory. When a directory structure with content management method or management policy reflected thereon is logically formed, a user can find a desired content easily because of arranging the contents sharing attribute under the directory on a browsing screen such as "explorer". In the directory structure, however, since a logical storage space called directory is formed within a physical storage space called disk, the display is to depend on a physical arrangement. Although this is applicable to a closed system in which all available contents are accumulated in one local disk, it becomes bothersome to search a desired content since plural contents related are displayed separately on each disk (i.e., across directories) when all available contents on a home LAN or the Internet become a target of viewing in the system in which a remote disk is transparently connected to a local disk.

The inventors consider there should be a suitable viewing style for each content. In the invention, although all available contents on a home LAN or a wide area network such as the Internet become a target of viewing, there is taken a viewing style not presenting bound by existence of content as an existing directory structure but making the content interesting a user easily viewable.

B. System Configuration

Figure 1:
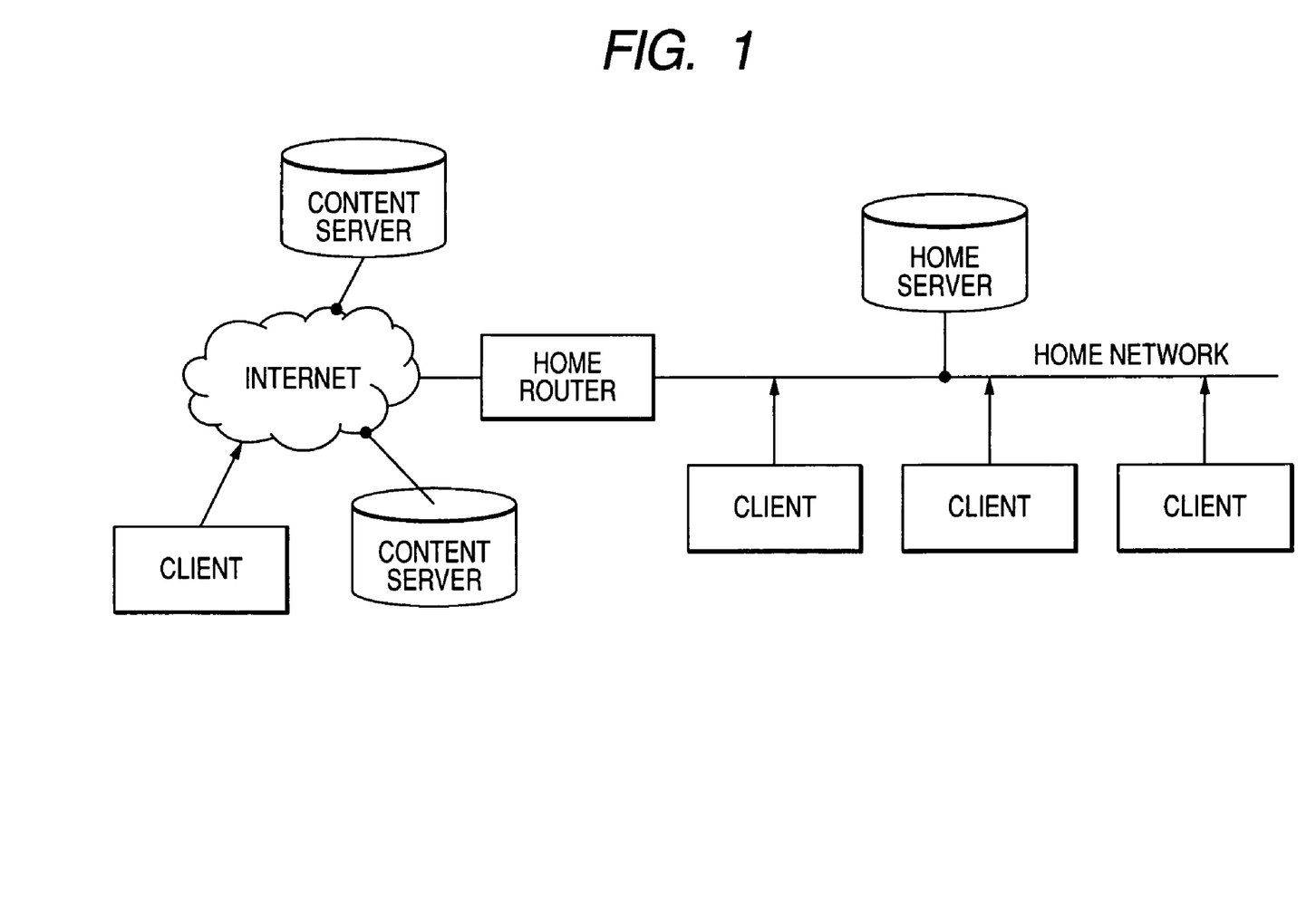
FIG. 1 is a diagram typically showing a network configuration in which content is used.

FIG. 1 is a diagram typically showing a network configuration in which content is used. On a home network, a home server and one or more client terminals exist. The home network is connected to an external network such as the Internet via a home router.

A client on the home network is such as PC, PDA, camcorder, digital camera, TV receiver, DVD player and HD recorder and performs generation, creation, playing, browsing and management of content.

The home server acquires content duly from a content server on the external network via the home router, accumulates the content and distributes the content at home. As a matter of course, the home server can acquire content with a method other than a network such as packaged media and broadcasting receiving.

Each client terminal requests a desired content to the home server and acquires it to use. Between the clients such as PC, camcorder, digital camera and TV receiver, the contents generated, created and received on their own are exchanged through the home server or directly with other clients.

The client terminal can use the content proposed on the home network or the content proposed by the content server on the external network connected via a router. According to the content management according to this embodiment, a content view screen is presented based on a content attribute such as 5 W's and an H regardless of actual existence of content entity. Accordingly, even a user searching content aimlessly can find the content interesting the user easily from a huge content presenting space.

Figure 2:
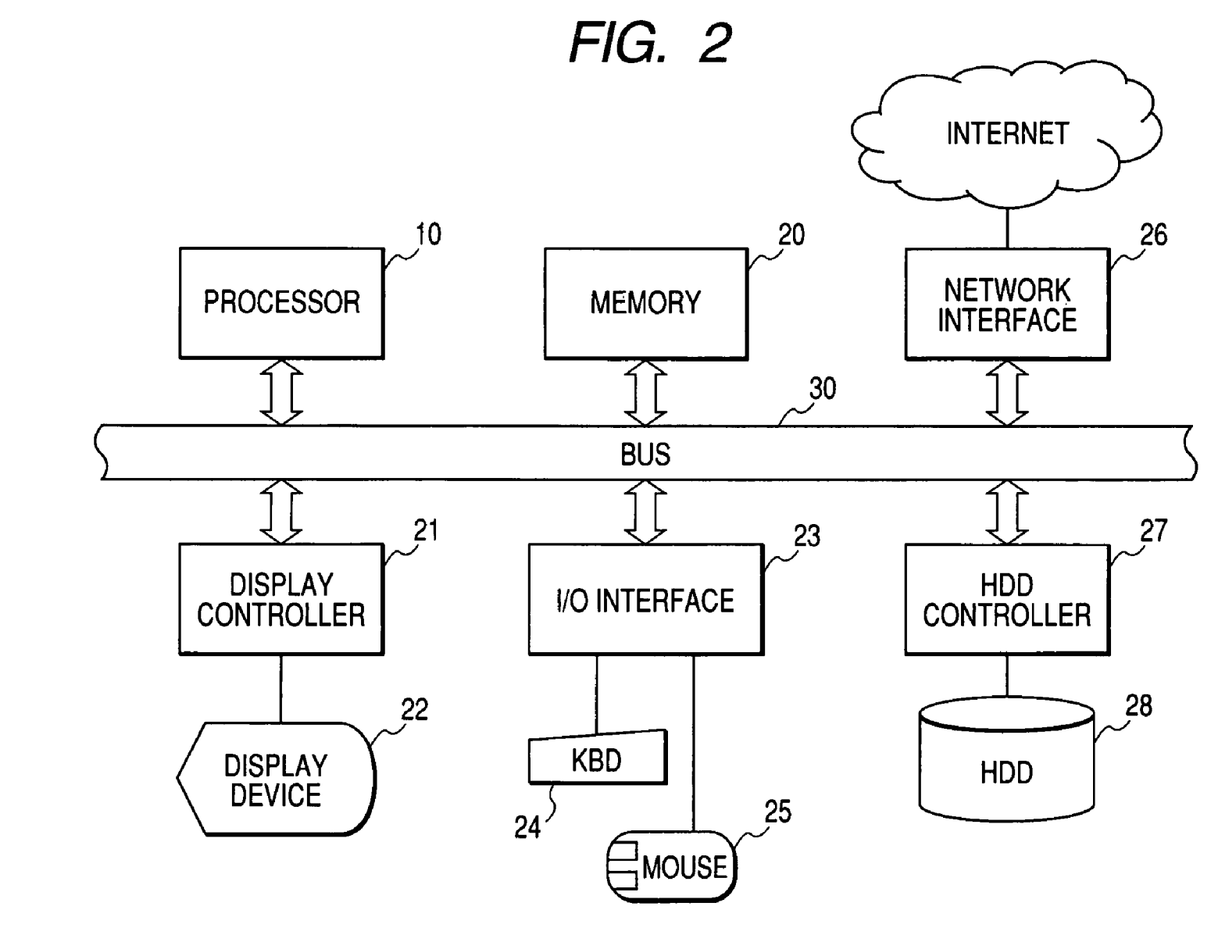
FIG. 2 is a diagram typically showing a hardware configuration of a system realizing content management.

FIG. 2 is a diagram typically showing a hardware configuration of a system realizing content management. This content management system is actually realized by starting a specific content management application on a computer system including PC or PDA under which a user views content.

A processor 10 is the center of the configuration of the system shown by Figure. The processor 10 performs various processes based on the program stored in a memory under a program execution environment proposed by operating system (OS). The processor 10 also controls various peripherals connected via an external bus interface 14 and a bus 30. The peripherals connected to the bus 30 are as follows.

A memory 20 is configured by a semiconductor memory such as DRAM (Dynamic RAM) and used to load a program code executed in the processor 10 and to store work data of the executed program temporarily. The memory 20 configures a memory space in the processor 10. In this embodiment, the processor 10 loads a predetermined content management application into the memory 20 to execute this and stores the work data for the content management in the memory 20.

A display controller 21 creates a display screen in accordance with the drawing command sent from the processor 10 and sends it to a display device 22. The display device 22 connected to the display controller 21 displays and outputs an image on the screen in accordance with the display image information sent from the display controller 21.

To an I/O interface 23, a keyboard 24 and a mouse 25 are connected, and the I/O interface 23 transfers an input signal from a user input device such as the keyboard 24 and the mouse 25 to the processor 10. When the system is in the form of a tablet computer and a PDA with touch panels, etc., the keyboard 24 and the mouse 25 may be replaced by a touch sensor (not shown) overlapped on the display screen of the display device 22, as a user input device.

The I/O interface 23 includes a general-purpose interface such as USB (Universal Serial Bus) and can connect various information devices to the computer system shown in Figure.

To a hard disk drive (HDD) controller 27, a large-capacity external memory device 28 such as HDD is connected, and the large-capacity external memory device 28 controls data input/output to the HDD with the HDD controller 27 connected. In the HDD 28, there are stored program of operating system (OS) to be executed by the processor, application program, driver program and data and content that are referred or played by the programs. Each program is installed on the HDD 28 in an executable form. The HDD 28 corresponds to a local disk and the content accumulated there is under management of the content management system.

A network interface 26 is connected to an external network such as LAN (Local Area Network) and the Internet and controls data communication through the Internet. In other words, the network interface 26 transfers the data sent from the processor 10 to other devices on the Internet and receives the data sent through the Internet to transmit to the processor 10. For example, the network interface 26 can receive program and data from the outside through the Internet. In this embodiment, content servers presenting content with or without compensation exist on an external network. These content servers function as a remote disk and the content accumulated there is under management of the content management system.

In addition, many electrical circuits are necessary as well as the components shown in FIG. 2 in order to configure an information-processing device such as personal computer. However, these are well-known to a person skilled in the art and do not configure the scope of the invention. Accordingly, they are omitted in this specification. Also, it is understood that only a part of connection between each of hardware blocks in Figure is shown in Figure in order to avoid a conflict of drawing.

Figure 3:
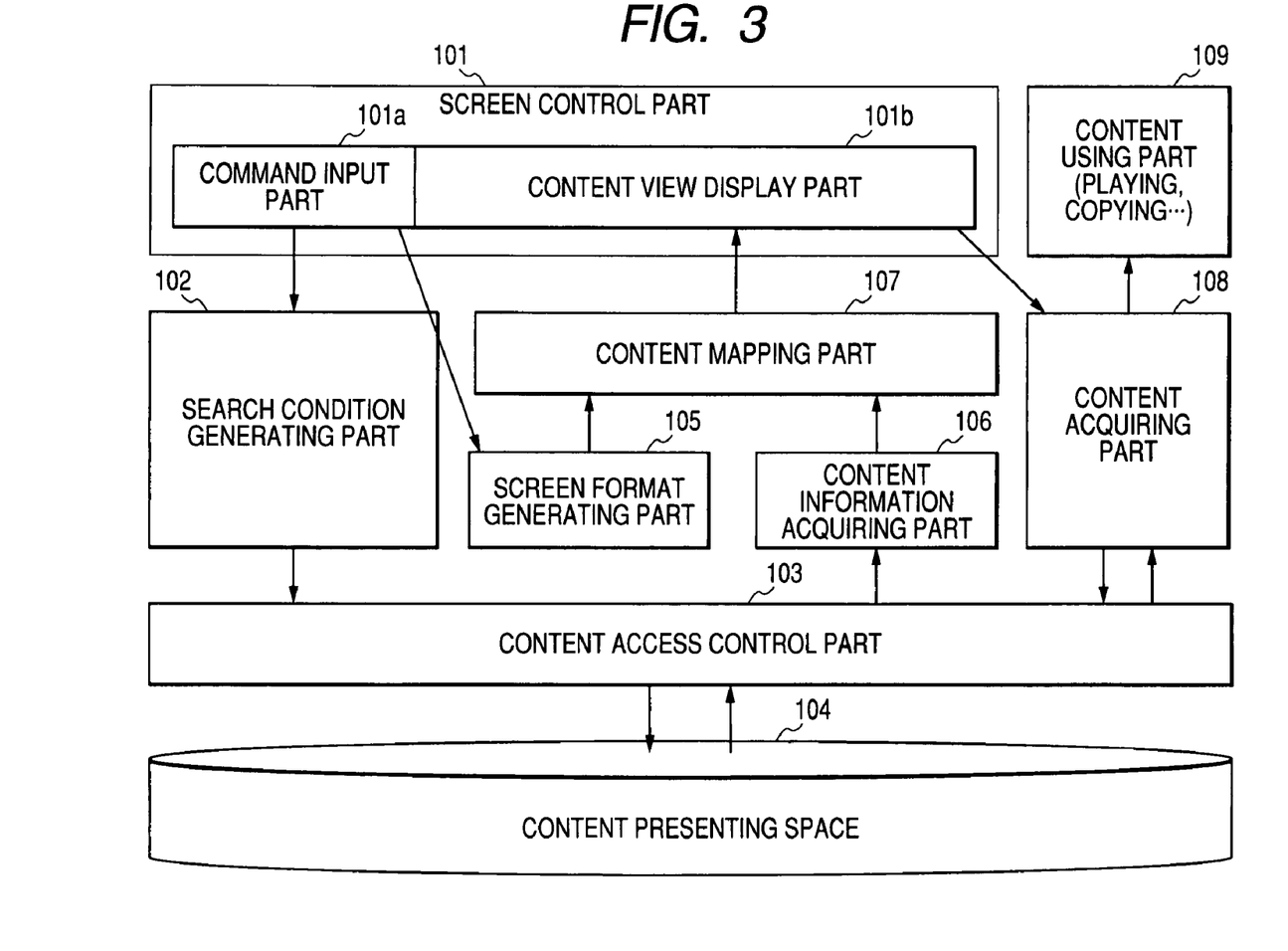
FIG. 3 is a diagram showing a functional configuration of a content management system according to an embodiment of the invention.

FIG. 3 is a diagram showing a functional configuration of a content management system according to an embodiment of the invention.

A screen control part 101 is a functional module controlling display contents on the screen of the display device 22 and corresponds to, for example, a window manager of operating system. In this embodiment, the screen control part 101 is configured by a command input part 101a such as toolbar (described later) for inputting a command from a user and a content view display part 101b for displaying a content browsing screen with a viewing style to be a key or a clue to a desired content for a user.

A search condition generating part 102 generates a search condition for extracting (filtering) content from a huge content presenting space. In this embodiment, there are provided with a random search mode searching the content randomly when a user has no object for searching the content, and a specific search mode with object (or search condition) specified (described later). In the random search mode, the search condition generating part 102 generates a search condition randomly, or extracts content regardless of a search condition. In the specific search mode, on the other hand, the search condition generating part 102 generates a search condition for extracting (filtering) content from a huge content presenting space based on a media type of content and other content attributes which are input from the command input part 101a.

A content access control part 103 is a functional module for controlling an access operation to a vast content presenting space 104 configured by a local disk and a remote disk, and corresponds to, for example, a file manager of operating system. The content access control part 103 retrieves content from the corresponding disk in response to content request specifying a bus name or a file name and searches the content presenting space 104 in accordance with the search condition generated by the search condition generating part 102.

A screen format generating part 105 generates a screen format for displaying a search result of content. In this embodiment, the screen format designed by likening to an infinite outer space is used for a background of search screen. The outer space displayed two- or three-dimensionally reminds of the vast content presenting space 104 and the contents accumulated in the content presenting space 104 are randomly mapped on individual stars on the outer space.

A content information acquiring part 106 acquires information on various contents extracted as a result of searching the content presenting space 104 in accordance with the search condition generated by the search condition generating part 102.

A content mapping part 107 maps the information on each content extracted by searching the content presenting space 104 on each corresponding part of the screen format generated by the screen format generating part 105. A viewing style screen with content information mapped is displayed by the content view display part 101b as a key or a clue to find content on a user's side.

A user searches for content through the content view display to specify the desired content. A content acquiring part 108 retrieves the specified content from the content presenting space 104 through the content access control part 103 and sends it to a content using part 109. The content using part 109 plays media content such as video and sound, copies content and uses the content acquired in the content acquiring part 108.

C. Content View

A content management system according to an embodiment of the invention supports effective use of content on a user's side by presenting a content view screen to be a key or a clue to a desired content while getting a user having no specific object interested in content.

The content management system according to this embodiment is provided with a random search mode searching the content randomly when a user has no object for searching the content, and a specific search mode with object (or search condition) specified.

Figure 4:
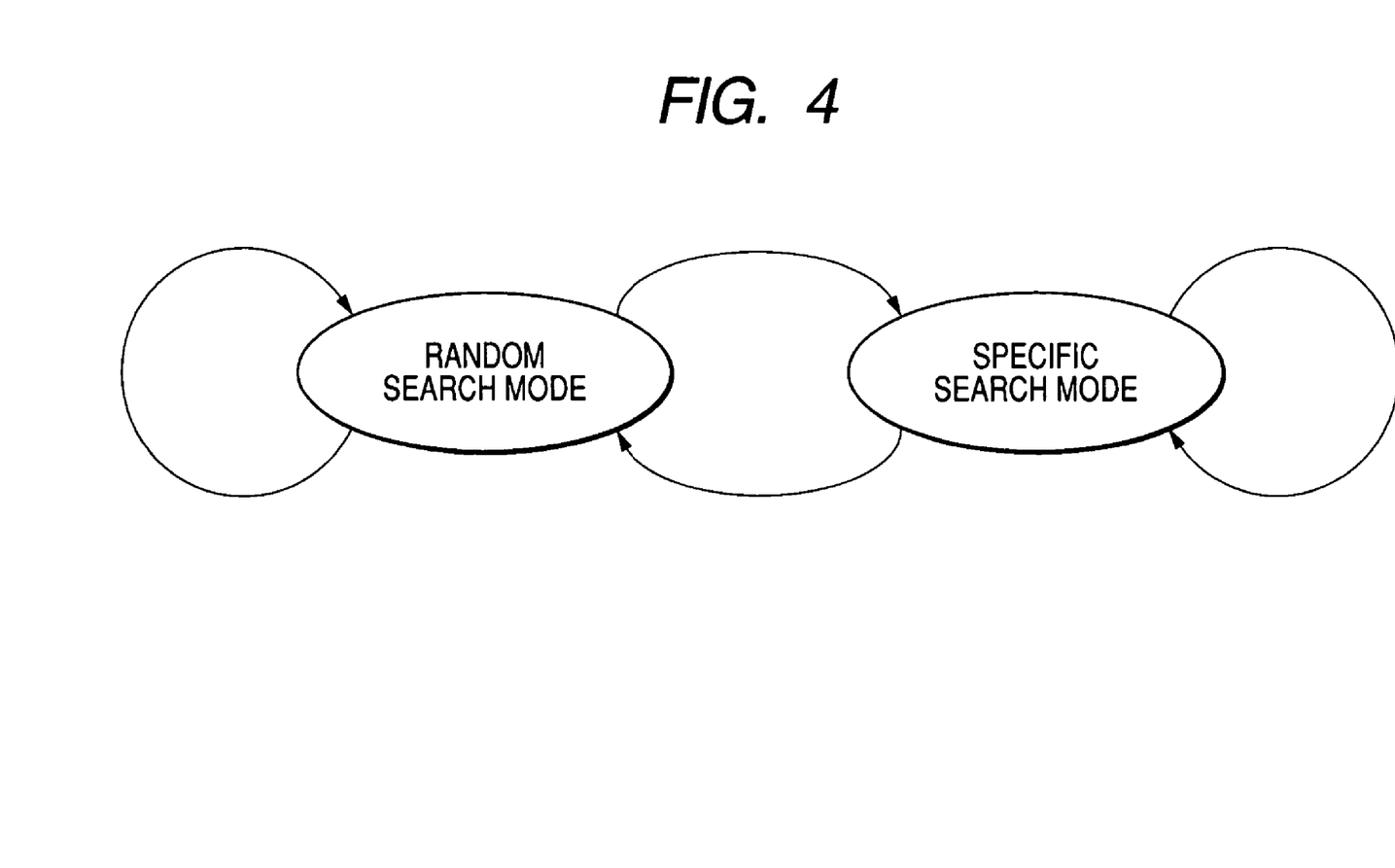
FIG. 4 is a state transition diagram showing an operation of the content management system according to an embodiment of the invention.

FIG. 4 is a state transition diagram showing an operation of the content management system. The system can switch freely from the random search mode to the specific search mode as shown in Figure.

For example, a user having no specific object extracts content randomly under the random search mode from a huge content presenting space. Also, for example, a user repeats this random searching until getting the content interesting the user or getting a clue to search content.

When the user can obtain an object to search content as a result of the random searching, or, when the user has an object to search content from the beginning, on the other hand, the user inputs a desired searching condition to carry out the specific search under the specific search mode. When the user cannot narrow the content sufficiently even with the specific search or the input searching condition is not appropriate, the searching condition is input again or the entry is corrected repeatedly under the specific search mode to search the expedient content in the content presenting space.

When reaching the desired content under the specific search mode or losing the object for other reasons, the process returns to the random search mode and the user searches the content interesting the user or a clue to search content.

Figure 5:
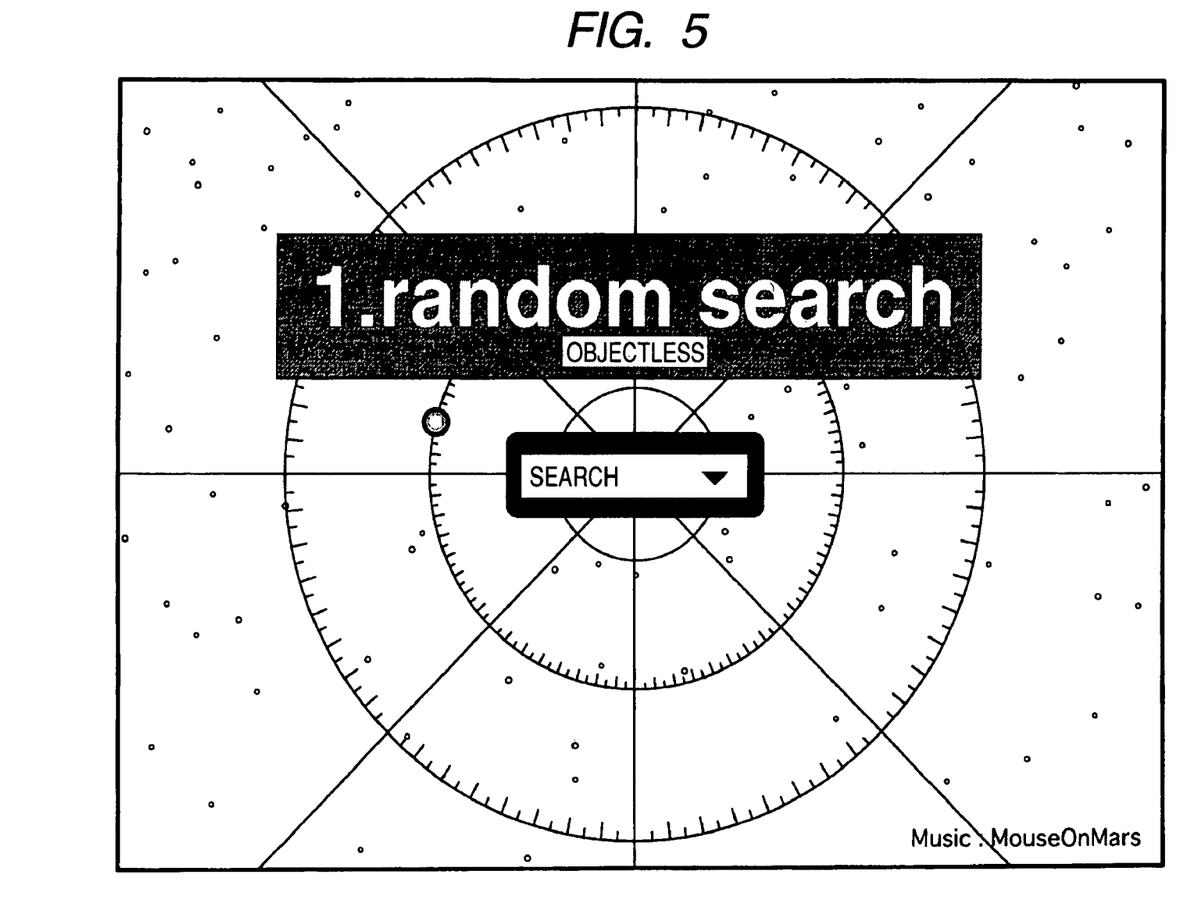
FIG. 5 is a diagram showing a configuration example of an initial screen presented by the content management system.

FIG. 5 is a diagram showing a configuration example of an initial screen presented by the content management system.

In an initial state, there is set at the random search mode. The background of search screen is designed by likening to infinite outer space. The content presenting space to be a target searched by the content management system is configured by enormous amount of contents of various media types accumulated in a device such as camcorder, digital camera, TV receiver, DVD player and HD recorder and in a content server on an external network such as the Internet connected through a router. The outer space displayed two- or three-dimensionally reminds of the vast content presenting space 104 and the contents accumulated in the content presenting space 104 are randomly mapped on individual stars on the outer space. A distance from a center of the outer space to the star shown in Figure indicates a matching degree of the search condition with the content allocated to the star. The content can be mapped multidimensionally based on the matching degree by displaying the outer space three-dimensionally.

In almost the middle of the search screen, a switching button of search mode is located. Operation of this button makes it possible to toggle between the random search mode and the specific search mode.

Figure 6:
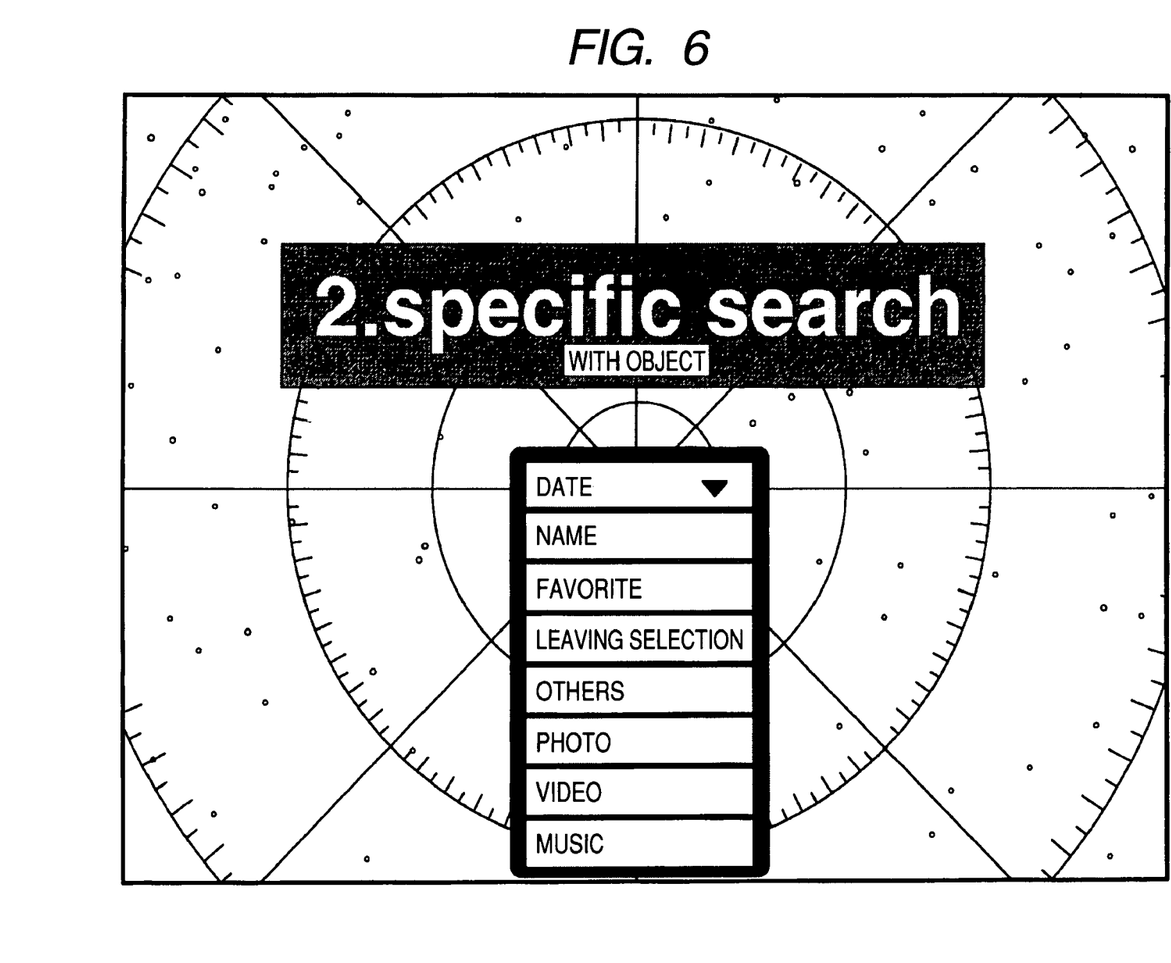
FIG. 6 is a diagram showing an example of screen configuration under a specific search mode.

FIG. 6 is a diagram showing an example of screen configuration under a specific search mode. As shown in Figure, a menu screen for inputting a search condition according to search item under the specific search mode. In the example of Figure, there are prepared as search items: date, content name, favorite, leaving selection, others, photo, video, music, etc.

Figure 7:
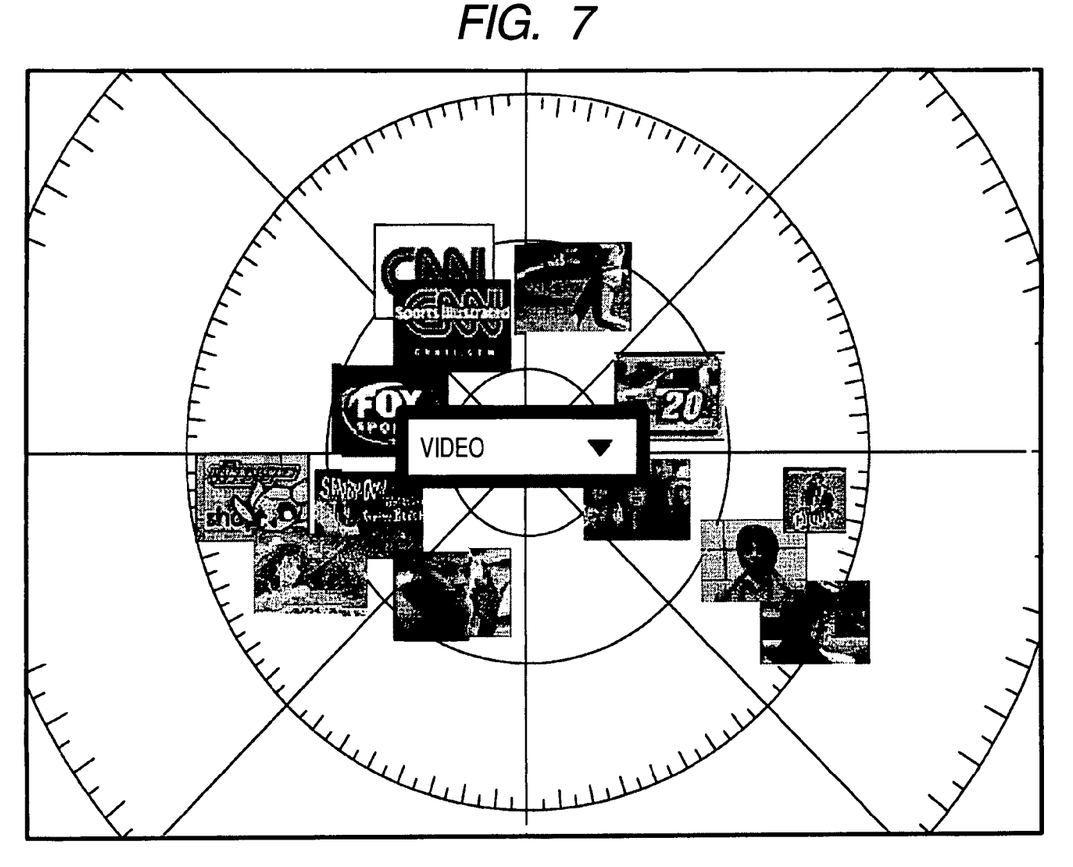
FIG. 7 is a diagram showing a configuration example of a screen displaying a searching result of video content.

When selecting video, for example, searching is performed limiting to video content in the content presenting space and the result is displayed on the screen. FIG. 7 is a diagram showing a configuration example of a screen displaying a searching result of video content. In the example of Figure, a representative frame (or jacket image) of each extracted video content is mapped on a background screen with an outer space likened. A fitness for the search condition, a matching degree with a user's preference and other meanings, can be defined for a distance from the center of the outer space to each content mapped on the star and a distance between stars, a direction from the center, a screen size and so on.

When a user selects a representative frame image of the desired content on such a search result screen by tapping and so on, playing process for the content starts.

Figure 8:
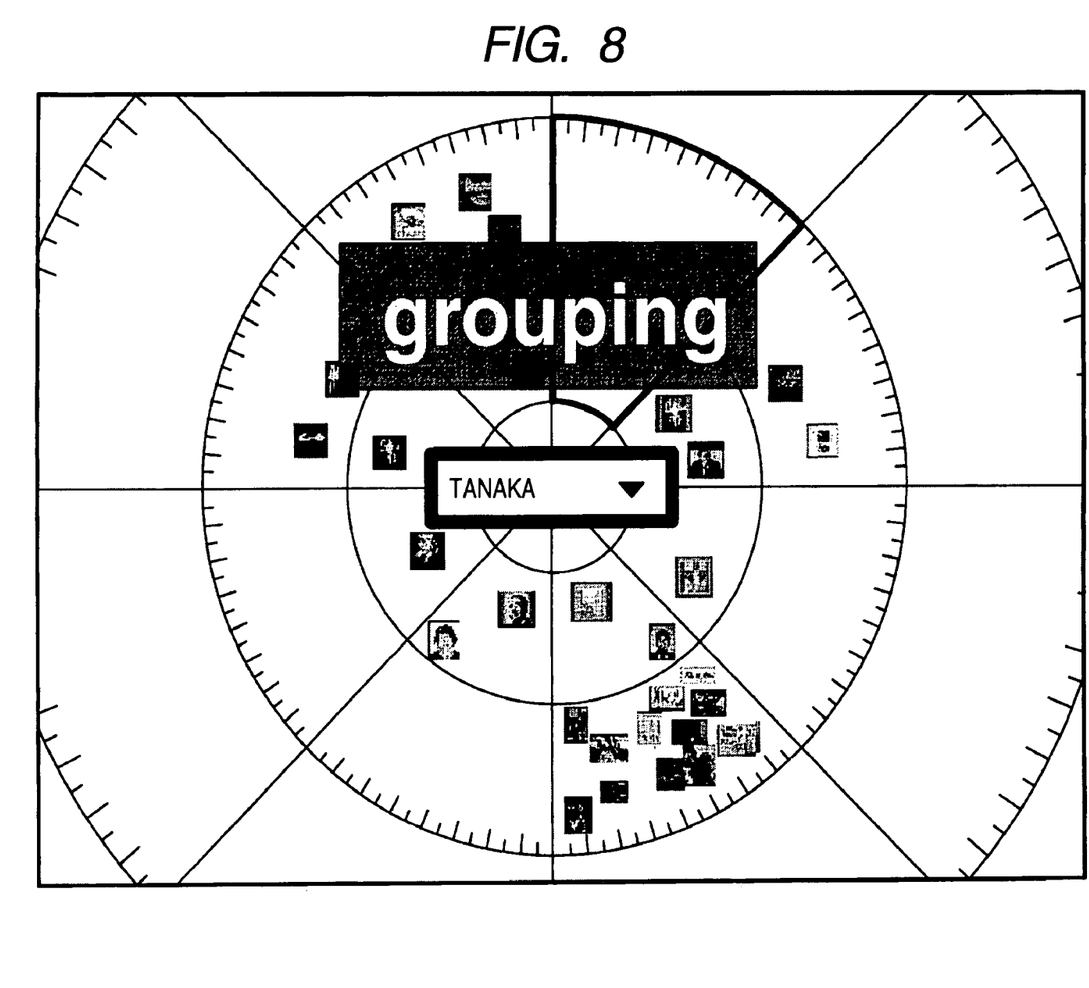
FIG. 8 is a diagram showing a configuration example of a screen grouping content.

From the obtained search results, only the desired results can be gathered to be grouped. FIG. 8 is a diagram showing a configuration example of a screen grouping content. The example in Figure shows the state of registering the content included in an area located within a range of a predetermined radius from the center of the outer space and within a predetermined angle and shown by a heavy-line frame as a group "tanaka". For example, registration as a group may be carried out by, for example, dragging the content out of the heavy-line frame area despite a desire of including in the group to this area.

Figure 9:
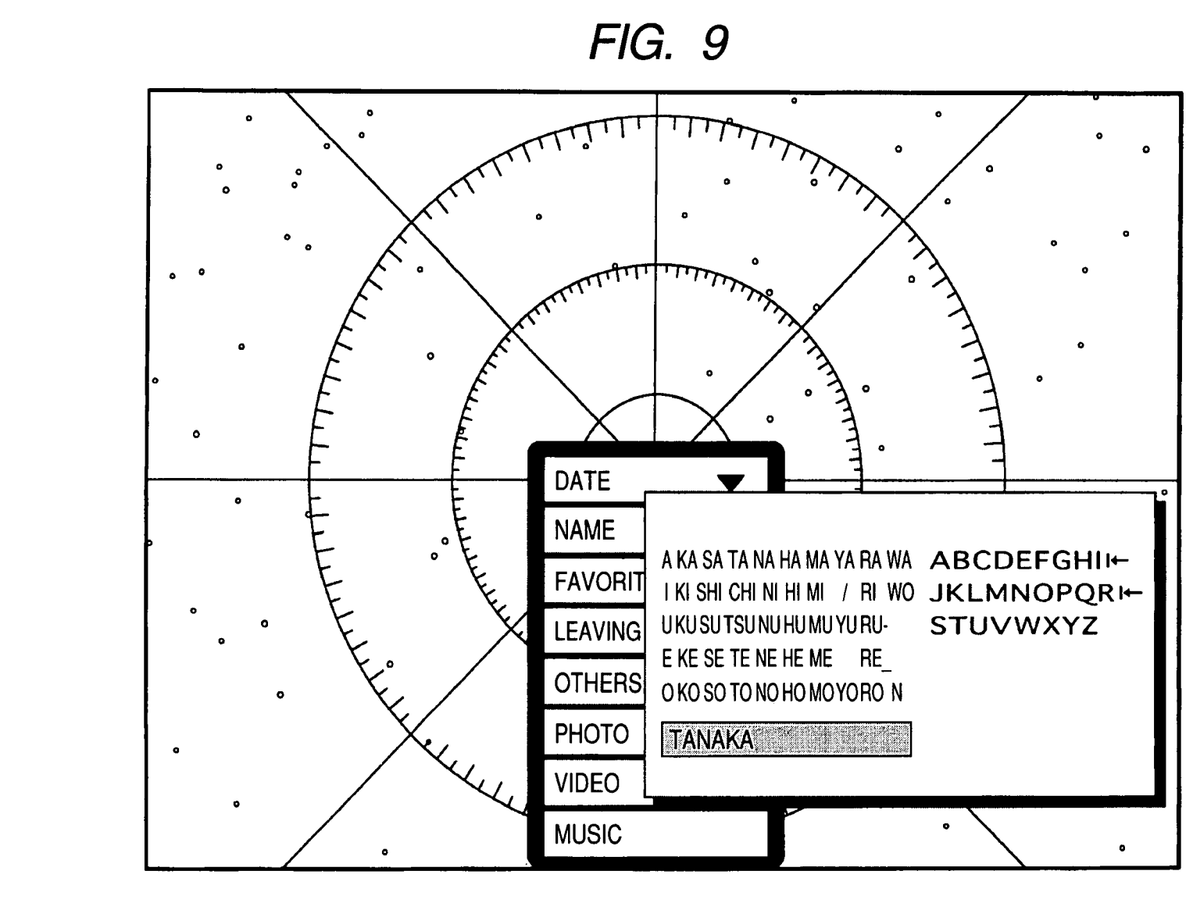
FIG. 9 is a diagram showing a state of performing character input on a search screen of content.

When inputting a group name or performing character input of search condition, input operation can be performed by calling a keyboard window shown in FIG. 9.

Figure 10:
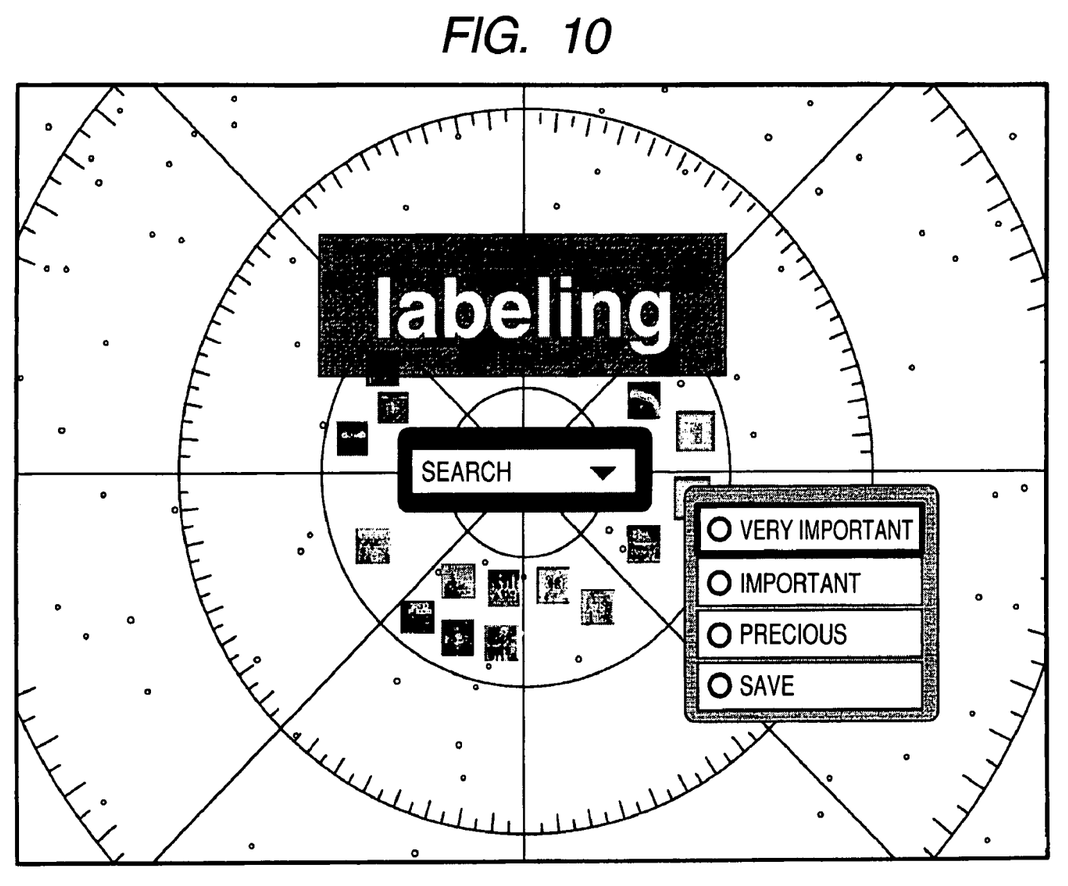
FIG. 10 is a diagram showing a state of labeling the content obtained by searching.

In addition, the search result can be labeled. FIG. 10 is a diagram showing a state of labeling the content obtained by searching. In the example of Figure, labels such as "very important", "important", "precious" and "save" can be attached by using a menu window.

It should be understood by those skilled in the art that various modifications, combinations, sub-combinations and alterations may occur depending on design requirements and other factors insofar as they are within the scope of the appended claims or the equivalents thereof.

What is claimed is:

1. A content management system for managing contents stored in multiple devices, comprising:
    a user input device for allowing a user to specify a content search mode and a content search condition;
    a display device for displaying a screen format in a two- or three-dimensional display form;
    a processor for generating the screen format, searching the devices for content according to the content search mode and the content search condition, and controlling so that information associated with the content retrieved is displayed by mapping the information on the screen format,
    wherein a distance from a center of the screen format to the mapped information and the size of the mapped information indicates a matching degree of the content search condition with the content associated with the information, and the processor maps the information three-dimensionally based on the matching degree by displaying the screen format three-dimensionally, and
    wherein the processor defines at least one of a fitness for the content search condition and a matching degree with a user's preference, based on at least one of a distance from the center of the screen format to the mapped information, a distance between other mapped information, a direction from the center of the screen format, and a size of the screen format.

2. A content management system according to claim 1, wherein the user input device allows the user to select one of a random search mode and a specific search mode; and
    wherein the processor searches for the content regardless of the content search condition when the user selects the random search mode, and
    searches for content based on the content search condition when the user selects the specific search mode.

3. A content management system according to claim 1, wherein the processor registers a content group mapped on an area within a range of a predetermined radius from the center of the screen format and within a predetermined angle as a group.

4. A content management system according to claim 1, wherein the screen format indicates a space for presenting the content stored in the devices.

5. A content management method for managing contents stored in multiple devices, comprising:
    determining a content search mode and a content search condition;
    generating a screen format in a two- or three-dimensional display form;
    searching the devices for content according to the content search mode and the content search condition; and
    displaying information associated with content retrieved by searching and mapping the information on the screen format,
    wherein a distance from a center of the screen format to the mapped information and the size of the mapped information indicates a matching degree of the content search condition with the content associated with the information, and the information is three-dimensionally mapped based on the matching degree by displaying the screen format three-dimensionally, and
    wherein, at least one of a fitness for the content search condition and a matching degree with a user's preference are represented by at least one of a distance from the center of the screen format to the mapped information, a distance between the mapped information and other mapped information, a direction from the center, and a screen format size.

6. A content management method according to claim 5, wherein the content search mode comprises one of a random search mode and a specific search mode, and
    wherein the content is extracted regardless of the content search condition when searching in the random search mode, and the content is extracted based on the content search condition input when searching in the specific search mode.

7. A content management method according to claim 5 further comprising, registering a content group mapped on an area within a range of a predetermined radius from the center of the screen format and within a predetermined angle as a group.

8. A content management method according to claim 5, wherein the screen format indicates a space for presenting the content stored in the multiple devices.

9. A computer readable storage medium storing a program for causing a computer to perform a method for managing contents stored in multiple devices, the method comprising:

determining a content search mode and a content search condition;

generating a screen format in a two- or three-dimensional display form;

searching the devices for content according to the content search mode and the content search condition; and     displaying information associated with content retrieved by searching and mapping the information on the screen format,     wherein a distance from a center of the screen format to the mapped information and the size of the mapped information indicates a matching degree of the content search condition with the content associated with the information, and the information is three-dimensionally mapped based on the matching degree by displaying the screen format three-dimensionally, and     wherein, at least one of a fitness for the content search condition and a matching degree with a user's preference are represented by at least one of a distance from the center of the screen format to the mapped information, a distance between the mapped information and other mapped information, a direction from the center, and a screen format size.

\* \* \* \* \*